(12) United States Patent
Burckart et al.

(10) Patent No.: US 8,636,592 B2
(45) Date of Patent: Jan. 28, 2014

(54) INTELLIGENT SCREEN SELECTION

(75) Inventors: Erik J. Burckart, Raleigh, NC (US);
Matthew L. Gauch, Raleigh, NC (US);
Andrew Ivory, Wake Forest, NC (US);
Aaron K. Shook, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 13/070,770

(22) Filed: Mar. 24, 2011

(65) Prior Publication Data

US 2012/0244934 A1 Sep. 27, 2012

(51) Int. Cl.
*A63F 9/24* (2006.01)
*A63F 13/00* (2006.01)

(52) U.S. Cl.
USPC .................................. 463/30; 463/42; 463/43

(58) Field of Classification Search
None
See application file for complete search history.

(56) References Cited

U.S. PATENT DOCUMENTS

| | | |
|---|---|---|
| 6,524,189 B1 | 2/2003 | Rautila |
| 6,540,614 B1 | 4/2003 | Nishino et al. |
| 7,034,776 B1 | 4/2006 | Love |
| 7,098,868 B2 | 8/2006 | Love et al. |
| 7,310,807 B2 | 12/2007 | Pearson et al. |
| 2003/0190957 A1* | 10/2003 | Tanskanen ........................ 463/41 |
| 2004/0147326 A1* | 7/2004 | Stiles ................................ 463/42 |
| 2006/0028398 A1 | 2/2006 | Willmore |
| 2006/0035711 A1 | 2/2006 | Samuels |
| 2006/0044216 A1* | 3/2006 | Love ................................ 345/1.3 |
| 2006/0148568 A1 | 7/2006 | Schultz et al. |
| 2007/0250900 A1 | 10/2007 | Marcuvitz |
| 2008/0090657 A1* | 4/2008 | Miller ............................... 463/31 |
| 2008/0214273 A1 | 9/2008 | Snoddy et al. |
| 2008/0318687 A1* | 12/2008 | Backer et al. ................... 463/42 |
| 2010/0069158 A1 | 3/2010 | Kim |

FOREIGN PATENT DOCUMENTS

WO    WO03047710 A2    6/2003

* cited by examiner

*Primary Examiner* — David L Lewis
*Assistant Examiner* — Shauna-Kay Hall
(74) *Attorney, Agent, or Firm* — Matthew B. Talpis; Gregory K. Goshorn; Greg Goshorn, P.C.

(57) ABSTRACT

Provided are technologies for the distribution of signals corresponding to players in a multi-player game situation to be distributed of appropriate video displays. Frames of a video signal are mapped to corresponding game controllers and the game controllers are mapped to display devices. Frames are then routed to an appropriate video display on a corresponding display device.

20 Claims, 5 Drawing Sheets

INTELLIGENT SCREEN SELECTION

BACKGROUND OF THE INVENTION

The claimed subject matter relates generally to video displays and, more specifically, to a system that detects viewers' locations and routes different content to appropriate locations.

Modern wiring technologies such as Category 6 Unshielded Twisted Pair (CAT-6) wiring, and perhaps wireless High Definition Multimedia Interface (HDMI) in the future, enable HDMI signals to be transmitted over longer distances than before. A modern home with multiple rooms typically has electronic components that communicate with each other and, although current systems enable a HDMI signal to be routed to multiple rooms or locations using CAT-6 wiring, current system route a similar HDMI signal to each location. For example, with respect to gaming devices, routing different signals to different locations currently requires multiple game consoles and a local area network (LAN) or Internet connection. One drawback of such a setup is that a server and multiple consoles are required, with correspondingly increased cost and complexity.

SUMMARY

Provided are techniques for detecting the location of different viewers of a display and routing content corresponding to the different users to the appropriate locations. The technology is applicable to, among other things, multi-player video game technologies that utilize a spit-screen display. In a multi-player, split-screen display, each player corresponds to a different portion of the split-screen. Even in conjunction with a large screen television (TV), a split-screen dilutes image quality. In addition, each player is able to view the display corresponding to the opponents.

One embodiment is a method comprising receiving a multiplayer game output signal corresponding to a plurality of player signals, each player signal corresponding to a particular player of a plurality of players of a video game; detecting presence data corresponding to a plurality of game controllers, where the presence data corresponds to the proximity of each game controller to a corresponding display device of a plurality of display devices; correlating each player signal of the plurality of player signals to a corresponding game controller of the plurality of game controllers; and transmitting each player signal to the corresponding display device of the corresponding game controller.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
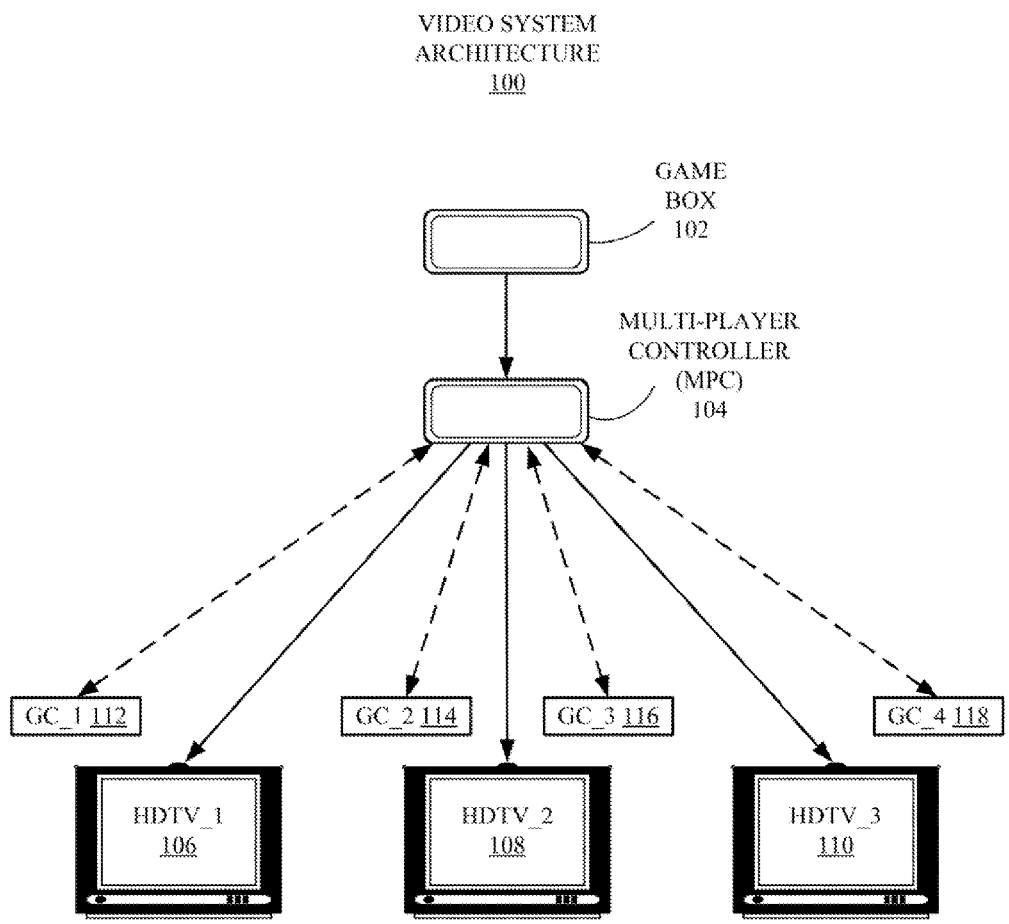
FIG. 1 is an illustration of a video system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is an illustration of a video system architecture 100 that may implement the claimed subject matter. In this example, video system architecture 100 includes a game box 102 and a multi-player controller (MPC) 104. Game box 102 may be any commercially available or yet to be developed game controller, a technology that will be familiar to one with skill in the relevant arts. Examples of game box include, but are not limited to, an Xbox produced by the Microsoft Corporation of Redmond, Wash. and the Wii, distributed by Nintendo of America Incorporated of Redmond, Wash.

Game controller 102 is communicatively coupled to MPC 104 such that video and audio signals generated by game controller 102 are transmitted to MPC 104. Although illustrated as a separate component, MPC 104 may also be incorporated into a game box, such as game box 102, or some other device such as a router (not shown) or signal splitter/extender (not shown). One example of a suitable splitter/extender is an HDMI spiller/extender manufactured by Network Technologies Incorporated (NTI) of Aurora, Ohio, that accepts a HDMI signal as input and outputs four signals via CAT-6 UTP cables.

In this example, MPC 104 is coupled to three (3) high definition televisions (HDTVs), specifically a HDTV_1 106, a HDTV_2 108 and a HDTV_3 110. For the sake of the following examples, HDTVs 106, 108 and 110 are not co-located. In other words, HDTVs 106, 108 and 110 may be located in different rooms of a single building or located in two or more different buildings. MPC 104 is also wirelessly coupled to four (4) game controllers (GCs), i.e. a GC_1 112, a GC_2 114, a GC_3 116 and a GC_4 118. Those with skill in the relevant arts will understand how game controllers typically work in conjunction with a game box and a single video display to enable users to control a video game executing on a game box. For the purposes of the following examples, GC_1 112 is in close proximity to HDTV_1 106, GC_2 114 and GC_3 116 are in close proximity to HDTV_2 108 and CG_4 118 is in close proximity to HDTV_3 110. Each controller 112, 114, 116 and 118 are employed by a corresponding user to control aspects of a game executing on game box 102. The control and distribution of signals corresponding to each user is explained in more detail below in conjunction with FIGS. 2-5.

Figure 2:
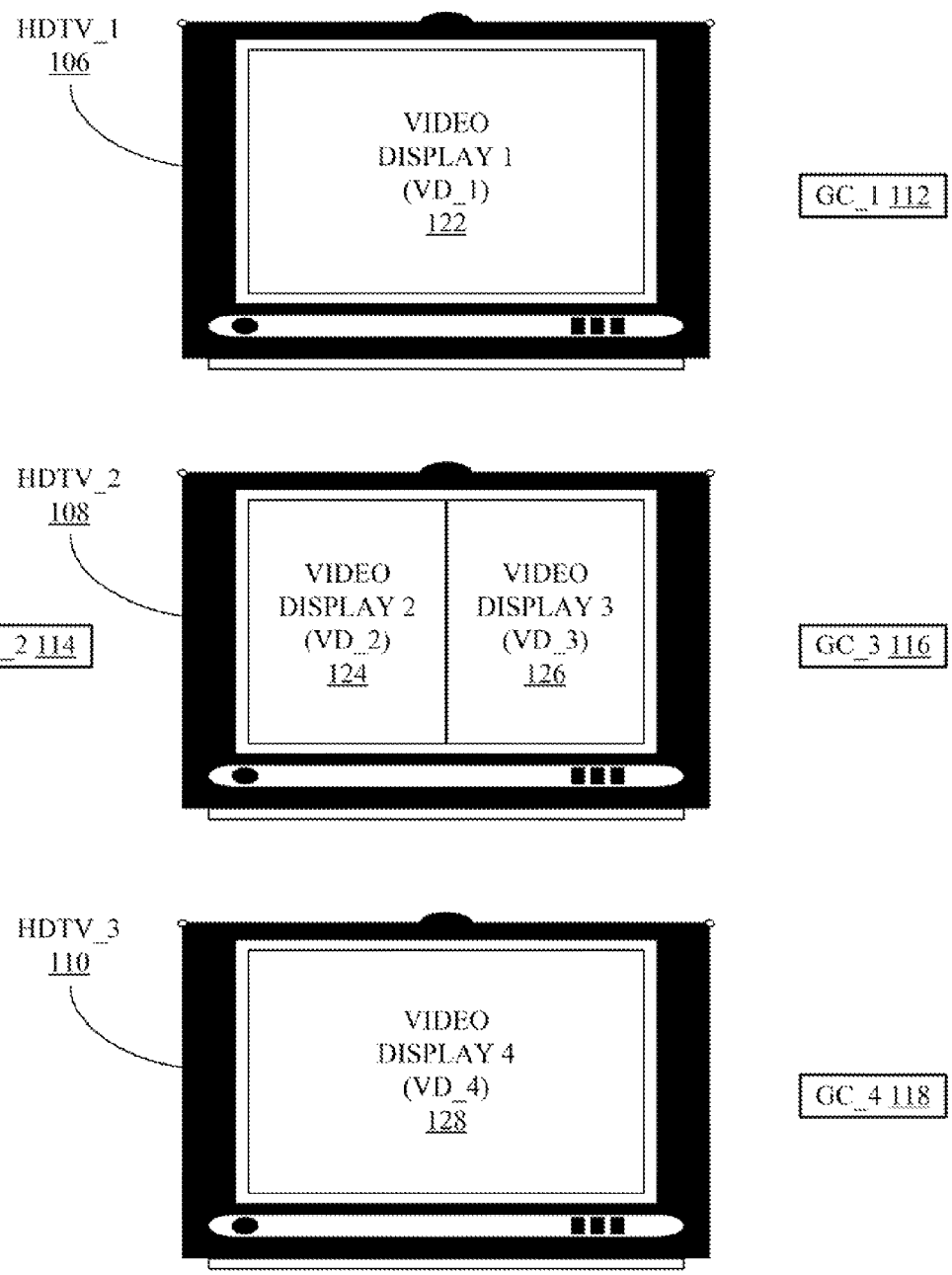
FIG. 2 is an illustration showing three video displays first introduced in conjunction with FIG. 1.

FIG. 2 is an illustration showing HDTVs 106, 108 and 110, first introduced in conjunction with FIG. 1. As explained above, in this example, HDTVs 106, 108 and 110 are not co-located. As in FIG. 1, GC_1 112, GC_2 114, GC_3 116 and GC_4 118 are illustrated with GC_1 112 located in proximity to HDTV_1 106, GC_2 114 and GC_3 116 in proximity to HDTV_2 108 and GC_4 118 in proximity to HDTV_4 110.

HDTV 106 is showing a first video display, or VD_1 122, that corresponds to a first user employing GC_1 112 to control corresponding aspects of a game executing on game box 102 (FIG. 1). A second and third users are employing GC_2 114 and GC_3 116, respectively, to control corresponding aspects of the game via a second video display, or VD_2 124, and a third video display, or VD_3 126, respectively, both of which are displayed in a spit-screen manner on HDTV_2 108. HDTV 110 is showing a fourth video display, or VD_4 128, that corresponds to a fourth user employing GC_4 118 to control corresponding aspects of the game executing on game box 102. The setup and control of video displays 122, 124, 166 and 128, in conjunction with game controllers 112, 114, 116 and 118, respectively, are described in detail below in conjunction with FIGS. 3-5.

Figure 3:
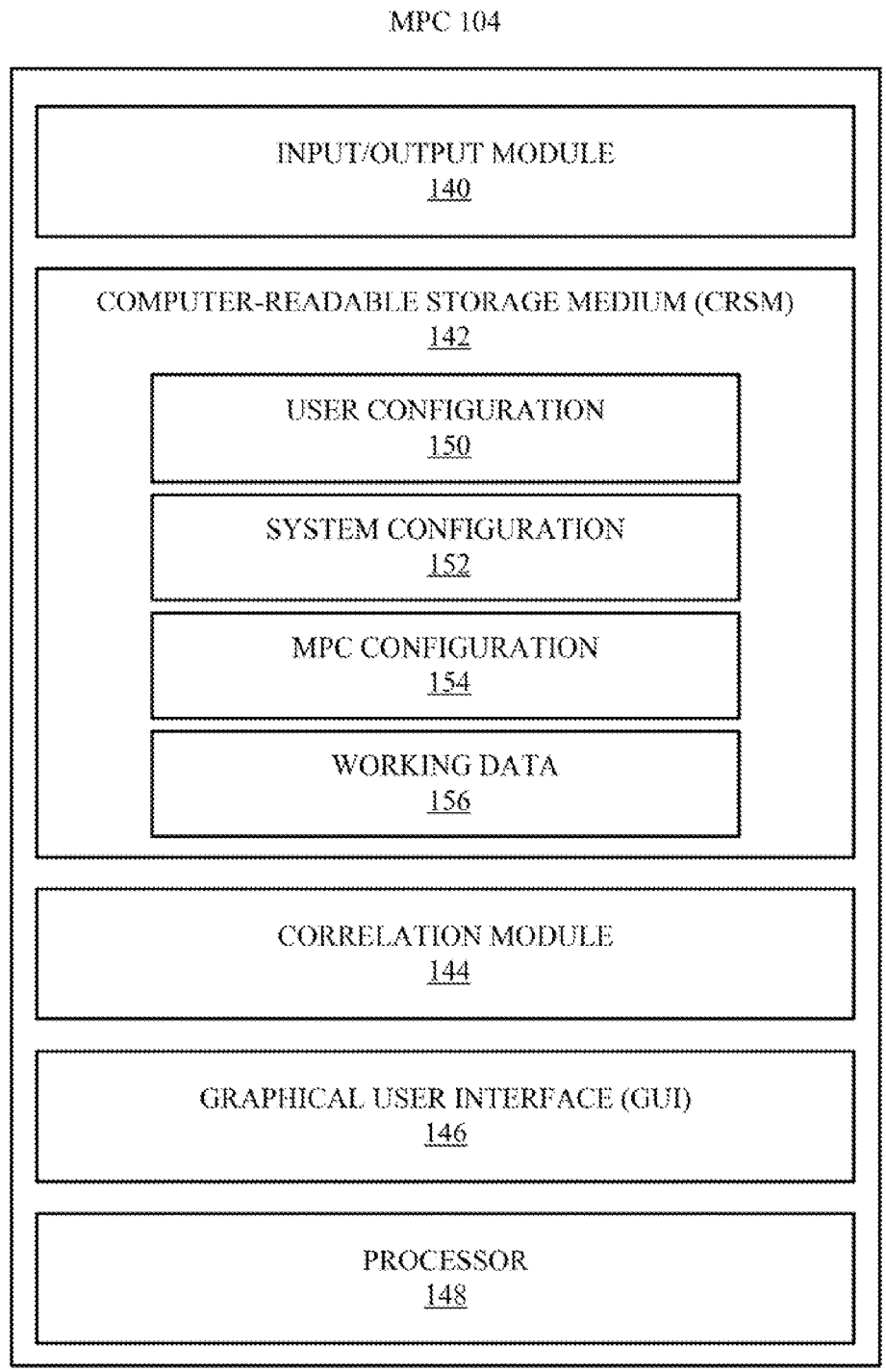
FIG. 3 is a block diagram of a multi-player controller (MPC), first introduced in conjunction with FIG. 1, in more detail.

FIG. 3 is a block diagram of MPC 104, first introduced in conjunction with FIG. 1, in more detail. MPC 104 includes an input/output (I/O) module 140, a computer-readable storage medium (CRSM) 142, a correlation module 144, a graphical user interface (GUI) module 146 and a processor 148. Although illustrated as separate from CPSM 142, correlation module 144 and GUI 146 may be stored as logic on CRSM 142 and executed on processor 148. It should be understood that the claimed subject matter can be implemented in conjunction many types of processing systems and data storage structures but, for the sake of simplicity, is described only in terms of game box 102 (FIG. 1), MPC 104 and video display architecture 100 (FIG. 1). Further, the representation of MPC 104 in FIG. 3 is a logical model. In other words, components 140, 142, 144, 146 and 148 may be stored in the same or separates files and loaded and/or executed within system 100 either as a single system or as separate processes interacting via any available inter process communication (IPC) techniques.

I/O module 140 handles any communication MPC 104 has with other components of system 100, such as, but not limited to, game box 102, game controllers 112, 114, 116 and 118 (FIGS. 1 and 2) and HDTVs 106, 108 and 110. CRSM 142 is a data repository for information, including configuration information, which MPC 104 employs during normal operation. Examples of the types of information stored in CRSM 142 include user configuration data 150, system configuration data 152, MPC configuration data 154 and working data 156.

User configuration 150 stores data on particular users of MPC 104 such as, but not limited to, information on each particular user's display preferences. System configuration 152 stores data on various hardware elements that interact with MPC 106. Examples of such elements include game box 102, game controllers 112, 114, 116 and 118 (FIGS. 1 and 2) and HDTVs 106, 108 and 110. MPC configuration 154 stores data that controls the operation of MPC 104 itself. Working data 156 is a data storage area that stores the results of intermediate calculations executed by MPC 104 or, in other words, is a temporary storage area for use during typical processing of MPC 104.

Correlation module 144 includes logic for correlating a particular frame of a video signal to a specific player in a multi-player game situation (see 258, FIG. 5), correlating a player to a specific controller (see 260, FIG. 5) and correlating game controller 112, 114, 116 and 118 with a particular HDTV 106, 108 and 110. As explained in more detail below in conjunction with FIG. 4, to correlate, or map, a controller to a display device, correlation module 144 receives information via I/O module 140 from each of active game controllers 112, 114, 116 and 118 and determines the particular HDTV 106, 108 and 110 that is in closest proximity to each game controller GUI component 146 enables users of backup monitor 118 to interact with and to define the desired functionality of backup monitor 118. Components 142, 144, 146, 148, 150, 152, 154 and 156 are described in more detail below in conjunction with FIGS. 3-5.

Figure 4:
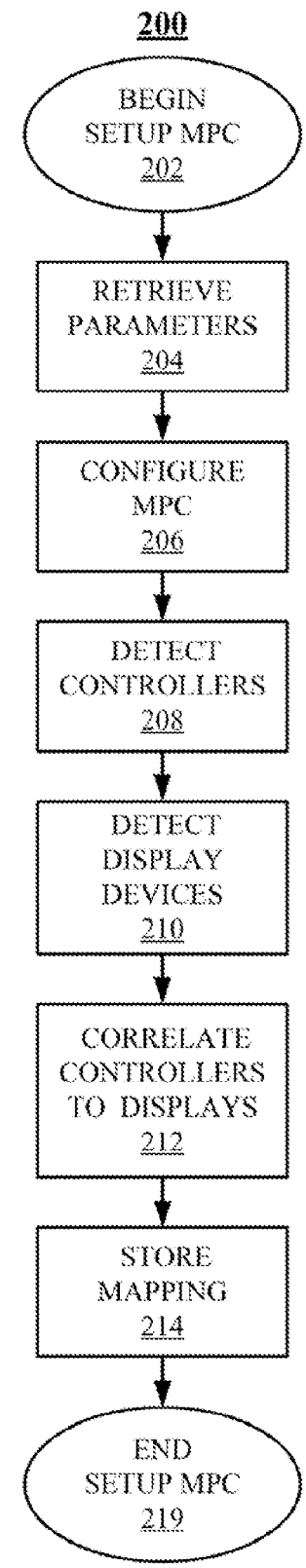
FIG. 4 is a flowchart of a Setup MPC process that may implement aspects of the claimed subject matter.

FIG. 4 is a flowchart of a Setup MPC process 200 that may implement aspects of the claimed subject matter. In this example, logic associated with process 200 is stored in CRSM 142 (FIG. 3) as part of MPC 104 (FIGS. 1 and 3) and executed on processor 148 (FIG. 3). In the alternative, process 200, as well as MPC 104 may be incorporated into a device such as game box 102 (FIG. 1).

Process 200 starts in a "Begin Setup MPC" block 202 and proceeds immediately to a "Retrieve Parameters" block 204. During processing associated with block 204, parameters associated with the configuration of 104 (see 154, FIG. 3), parameters associated with devices of video system architecture 100 (FIG. 1) (see 152, FIG. 3) and parameters associated with define users of video system architecture (see 150, FIG. 3) are retrieved from CRSM 142. During processing associated with a "Configure MPC" block 206, MPC 104 is configured according options controlled by administrator-defined parameters. Types of configuration options include, but are not limited to, maximum numbers of players and/or devices and procedures with respect to any conflicting setups that may arise.

During processing associated with a "Detect Controllers" block 208, a survey is taken of active controllers, such as GC_1 112, GC_2 114, GC_3 116 and GC_4 118 (FIGS. 1 and 2), and any users that maybe associated with each active controller. In other words, some controllers may be powered on and others not. To correlate, or map, a controller to a display device, correlation module 144 receives information via I/O module 140 (FIG. 3) from each of active game controllers 112, 114, 116 and 118 and determines the particular HDTV 106, 108 and 110 that is in closest proximity to each game controller During processing associated with a "Detect Displays" block 210, each controller detected during processing associated with block 208 transmits a signal, or "pings," display devices, such as HDTV_1 106, HDTV_2 108 and HDTV_3 110 (FIGS. 1 and 2), that may be in proximity to the particular controller and relays that information to MPC 104. During processing associated with a "Correlate Controllers to Displays" block 212, each controller detected during processing associated with block 208 is mapped to an available display, such as VD_1 122, VD_2 124, VD_3 126 and VD_4 126 (FIG. 2), as determined by information received during processing associated with block 210. It should be noted that some display devices may be mapped to more than one controller such that multiple displays are required on any particular display device. In this example, GC_1 112 is mapped to VD_1 122 on HDTV_1 106, GC_2 114 and GC_3 116 are mapped to VD_2 124 and VD_3 126 respectively, on HDTV_2 108 and GC_4 18 is mapped VD_4 128 on HDTV_3 110.

Figure 5:
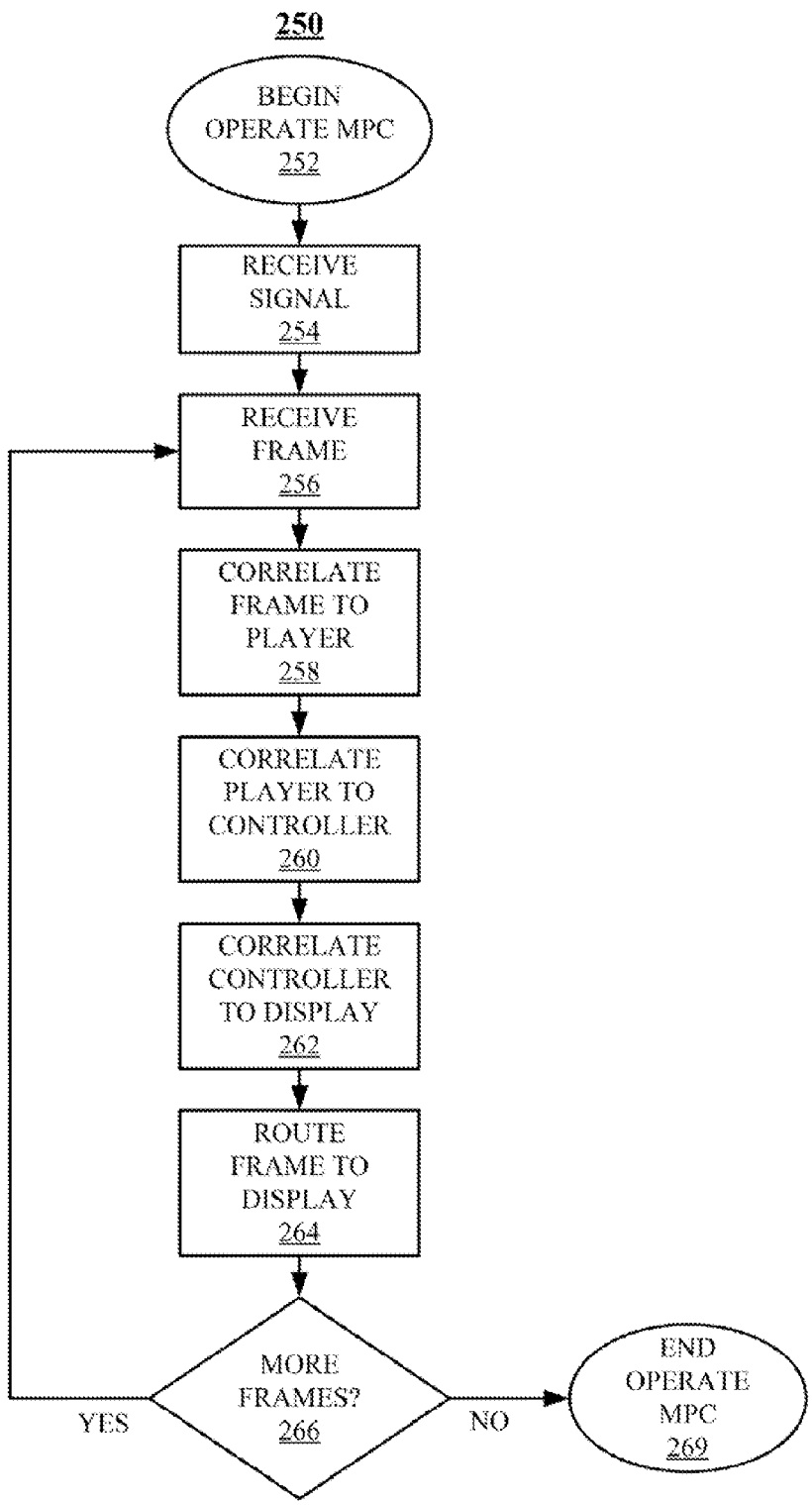
FIG. 5 is a flowchart of an Operate MPC process that may implement aspects of the claimed subject matter.

During processing associated with a "Store Mapping" block 214, mappings generated during processing associated with block 212 are stored in working data 156 (FIG. 3) of MPC 104 so that the mappings are available to control operations of MPC 104 during normal processing (see 250, FIG. 5). Finally, during processing associated with an "End Setup MPC" block 219, process 200 is complete.

FIG. 5 is a flowchart of an Operate MPC process 250 that may implement aspects of the claimed subject matter. Like process 200 (FIG. 4), logic associated with process 250 is stored in CRSM 142 (FIG. 3) as part of MPC 104 (FIGS. 1 and 3) and executed on processor 148 (FIG. 3).

Process 250 starts in a "Begin Operate MPC" block 252 and proceeds immediately to a "Retrieve Signal" block 254. During processing associated with block 254, a video signal, corresponding to a multi-player game, is received from, in this example, game box 102 (FIG. 1). Such a signal is typically composed of a succession of frames and, during processing associated with a "Receive Frame" block 256 a first frame is received for processing. During processing associated with a "Correlate Frame to Player" block 258, the video frame received during processing associated with block 256 is mapped to a particular player of the multi-player game (see 144, FIG. 3). During processing associated with a "Correlate Player to Controller" block 260, the player identified during processing associated with block 258 is mapped to a particular controller such as GC_1-4 112, 114, 116 and 118 (FIGS. 1 and 2). In the alternative, rather than identifying players and corresponding controllers, frames may be associated directly with particular controllers.

During processing associate with a "Correlate Controller to Display" block 262, the controller identified during processing associated with block 262, and therefore the corresponding player and frame, is mapped to a particular video display such as VD_1-4 122, 124, 126 and 128 (FIG. 2). As explained above, each video display corresponds to a particular display device such as HDTV_1-3 106, 108 and 110 (FIGS. 1 and 2). During processing associated with a "Route Frame to Display" 264, the frame received during block 256 is routed to the appropriate video display 122, 124, 126 and 128 on the appropriate display device 106, 108 and 110 as determined by the processing associated with blocks 258, 260 and 262.

During processing associated with a "More Frames?" block 266, a determination is made as to whether or not there are more frames to be processed in the signal received during processing associated with block 254. If so, process 250 returns to block 256, receives the next frame to be processed and processing continues as described above. If not, process 250 proceeds to an "End Operate MPC" block 269 in which process 250 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
  receiving a multiplayer game output signal corresponding to a plurality of player signals, each player signal corresponding to a particular player of a plurality of players of a video game;
  generating data corresponding to a plurality of game controllers, where the data corresponds to a physical distance of each game controller to a corresponding display device of a plurality of display devices;
  correlating each player signal of the plurality of player signals to a corresponding game controller of the plurality of game controllers and, based upon the data, each game controller to a corresponding display device of the plurality of display devices;
  transmitting each player signal to the corresponding display device of the corresponding game controller; and
  displaying each player signal on the corresponding display device.

2. The method of claim 1, further comprising:
  detecting that two controllers of the plurality of controllers correspond to a particular display device;
  generating a split screen signal based upon the player signals corresponding to the two controllers; and
  transmitting the player signals corresponding to the two controllers to the particular display device as the split screen signal.

3. The method of claim 1, wherein the plurality of display devices are high definition televisions.

4. The method of claim 1, wherein the multiplayer game output signal is generated by a game console.

5. The method of claim 1, wherein the multiplayer game output signal is received from the Internet.

6. The method of claim 1, wherein the player signals are transmitted to the display devices via Category 6 Unshielded Twisted Pair (CAT-6) wiring.

7. The method of claim 1, wherein the multiplayer game output signal is a High Definition Multimedia Interface (HDMI) signal.

8. An apparatus, comprising:
  a processor;
  a non-transitory computer readable storage media coupled to the processor; and
  logic stored on the computer readable storage media and executed on the processor for:
    receiving a multiplayer game output signal corresponding to a plurality of player signals, each player signal corresponding to a particular player of a plurality of players of to video game;
    generating data corresponding to a plurality of game controllers, where the data corresponds to a physical distance of each game controller to a corresponding display device of a plurality of display devices;
    correlating each player signal of the plurality of player signals to a corresponding game controller of the plurality of game controllers and, based upon the data, each game controller to a corresponding display device of the plurality of display devices; and
    transmitting each player signal to the corresponding display device of the corresponding game controller.

9. The apparatus of claim 8, the logic further comprising logic for:
  detecting that two controllers of the plurality of controllers correspond to a particular display device;
  generating a split screen signal based upon the player signals corresponding to the two controllers; and
  transmitting the player signals corresponding to the two controllers to the particular display device as the split screen signal.

10. The apparatus of claim 8, wherein the plurality of display devices are high definition televisions.

11. The apparatus of claim 8, wherein the multiplayer game output signal is generated by a game console.

12. The apparatus of claim 8, wherein the multiplayer game output signal is received from the Internet.

13. The apparatus of claim 8, wherein the player signals are transmitted to the display devices via Category 6 Unshielded Twisted Pair (CAT-6) wiring.

14. The apparatus of claim 1, wherein the multiplayer game output signal is a High Definition Multimedia Interface (HDMI) signal.

15. A computer programming product, comprising:
  a processor;
  a non-transitory computer readable storage media coupled to the processor; and
  logic stored on the computer readable storage media and executed on the processor for:

receiving a multiplayer game output signal corresponding to a plurality of player signals, each player signal corresponding to a particular player of a plurality of players of a video game;

generating data corresponding to a plurality of game controllers, where the data corresponds to a physical distance of each game controller to a corresponding display device of a plurality of display devices;

correlating each player signal of the plurality of player signals to a corresponding game controller of the plurality of game controllers and, based upon the data, each game controller to a corresponding display device of the plurality of display device; and transmitting each player signal to the corresponding display device of the corresponding game controller.

16. The computer programming product of claim 15, the logic further comprising logic for:

detecting that two controllers of the plurality of controllers correspond to a particular display device;

generating a split screen signal based upon the player signals corresponding to the two controllers; and transmitting the player signals corresponding to the two controllers to the particular display device as the split screen signal.

17. The computer programming product of claim 15, wherein the plurality of display devices are high definition televisions.

18. The computer programming product of claim 15, wherein the multiplayer game output signal is generated by a game console.

19. The computer programming product of claim 15, wherein the multiplayer game output signal is received from the Internet.

20. The computer programming product of claim 15, wherein the player signals are transmitted to the display devices via Category 6 Unshielded Twisted Pair (CAT-6) wiring.

* * * * *